US010402178B2

(12) United States Patent
Swiecki et al.

(10) Patent No.: US 10,402,178 B2
(45) Date of Patent: Sep. 3, 2019

(54) CROSS PLATFORM CONTENT MANAGEMENT AND DISTRIBUTION SYSTEM

(71) Applicant: Accenture Global Solutions Limited, Dublin (IE)

(72) Inventors: Bogumil Swiecki, Dublin (IE); Brent R. Blum, San Francisco, CA (US); Guillaume P. Carre, Costa Mesa, CA (US); Sarah Healy, Kinsealy (IE); Vanessa Oliva Araujo, Dublin (IE); Eoghan Kidney, Dublin (IE); David Joseph Arendash, Fremont, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/881,039

(22) Filed: Jan. 26, 2018

(65) Prior Publication Data

US 2019/0235848 A1    Aug. 1, 2019

(51) Int. Cl.
*H04L 29/08* (2006.01)
*G06F 17/30* (2006.01)
*H04L 29/06* (2006.01)
*G06F 8/41* (2018.01)
*G06F 8/71* (2018.01)

(52) U.S. Cl.
CPC .............. *G06F 8/47* (2013.01); *G06F 8/447* (2013.01); *G06F 8/71* (2013.01)

(58) Field of Classification Search
CPC ....... G06Q 50/01; G06F 17/2247; G06F 8/47; G06F 8/447; G06F 8/71; G06F 21/10; H04L 67/306; H04L 65/4084; H04L 67/10; H04N 21/812
See application file for complete search history.

(56) References Cited

U.S. PATENT DOCUMENTS

| 7,890,428 | B2 | 2/2011 | Brooks et al. |
| 8,805,270 | B2 * | 8/2014 | Maharajh ............... G06Q 10/10 455/3.01 |
| 9,015,275 | B2 * | 4/2015 | Raciborski ............. H04L 67/06 709/217 |
| 9,069,599 | B2 | 6/2015 | Martinez et al. |

(Continued)

OTHER PUBLICATIONS

Schlegel et al., A platform for contextual multimedia data: towards a unified metadata model and querying, 8 pages (Year: 2015).*

(Continued)

*Primary Examiner* — Thuy Dao
(74) *Attorney, Agent, or Firm* — Harrity & Harrity, LLP

(57) ABSTRACT

A device receives a request to publish content for different computing platforms, and receives the content to be published for the different computing platforms. The device reconfigures the content for the different computing platforms, based on one or more labeled categories of information, to generate different reconfigured content, and compiles the different reconfigured content, based on the one or more labeled categories of information, to generate different compiled content for the different computing platforms. The device provides at least one of the different compiled content to a client device associated with at least one of the different computing platforms.

20 Claims, 11 Drawing Sheets

(56) References Cited

U.S. PATENT DOCUMENTS

| | | |
|---|---|---|
| 9,141,365 B1 | 9/2015 | Zander et al. |
| 9,223,550 B1 | 12/2015 | Bastien et al. |
| 9,268,829 B2 * | 2/2016 | Carpenter ............... H04L 67/10 |
| 9,413,710 B1 * | 8/2016 | Saylor .................... H04L 51/32 |
| 9,549,044 B1 | 1/2017 | Bell et al. |
| 9,563,414 B2 * | 2/2017 | Berg ..................... H04J 3/0667 |
| 9,645,814 B1 | 5/2017 | Roque et al. |
| 9,712,486 B2 | 7/2017 | Johnson et al. |
| 10,083,234 B2 * | 9/2018 | Maharajh ............... G06Q 10/10 |
| 10,203,941 B1 | 2/2019 | Swiecki et al. |
| 2002/0092002 A1 | 7/2002 | Babaian et al. |
| 2003/0088639 A1 * | 5/2003 | Lentini ............... G06F 17/3092 709/217 |
| 2003/0172168 A1 * | 9/2003 | Mak .................. G06F 17/30569 709/230 |
| 2004/0103405 A1 * | 5/2004 | Vargas ..................... G06F 8/51 717/137 |
| 2004/0153661 A1 * | 8/2004 | Graunke ............... G06F 21/125 713/194 |
| 2007/0067569 A1 * | 3/2007 | Vittal .................. G06F 12/0804 711/118 |
| 2011/0004878 A1 | 1/2011 | Divoux et al. |
| 2013/0014274 A1 * | 1/2013 | Goodes ............... G06F 21/6209 726/26 |
| 2013/0060767 A1 * | 3/2013 | Bowers ............ G06F 17/30038 707/724 |
| 2015/0074397 A1 * | 3/2015 | Dube ................ G06F 17/30011 713/168 |
| 2015/0302182 A1 | 10/2015 | Wyatt et al. |
| 2016/0321045 A1 | 11/2016 | Radigan et al. |
| 2018/0189285 A1 * | 7/2018 | Downey ............ H04N 21/4722 |

OTHER PUBLICATIONS

D. Vassileva, Evaluation of learning styles adaption in the adopta e-learning platform, 6 pages (Year: 2011).*

ADVR, "How ADVR Works", https://www.advr.io/howadvrworks/, Feb. 11, 2017, 3 pages.

Arzt S., et al., Towards Cross-Platform Cross-Language Analysis with Soot, 2016, 6 pages.

Goaer O.L., et al., Yet Another DSL for Cross-Platforms Mobile Development, 2013, 6 pages.

Neto M., et al., Cross-Platform Multimedia Application Development: For Mobile, Web, Embedded and IoT with Qt/2017, 4 pages.

Extended European Search Report for Application No. EP19153446.0, dated May 28, 2019, 9 pages.

* cited by examiner

CROSS PLATFORM CONTENT MANAGEMENT AND DISTRIBUTION SYSTEM

BACKGROUND

Computer software developers create may different types of content, such as word processing content, financial software, virtual reality software, two-dimensional (2D) and three-dimensional (3D) video games and content, and/or the like. In order to receive a return on the cost of developing such content, the developers typically need to configure and compile the content for different types of computing platforms (e.g., mobile device platforms, desktop computer platforms, gaming system platforms, and/or the like).

SUMMARY

According to some implementations, a device may include one or more memories, and one or more processors, communicatively coupled to the one or more memories, to receive a request to publish content for different computing platforms, and receive the content to be published for the different computing platforms. The one or more processors may reconfigure the content for the different computing platforms, based on one or more labeled categories of information, to generate different reconfigured content, and may compile the different reconfigured content, based on the one or more labeled categories of information, to generate different compiled content for the different computing platforms. The one or more processors may provide at least one of the different compiled content to a client device associated with at least one of the different computing platforms.

According to some implementations, a non-transitory computer-readable medium may store instructions that include one or more instructions that, when executed by one or more processors, cause the one or more processors to receive a request to configure and compile content for different computing platforms, and receive the content and content information associated with the content, where the content information includes metadata associated with the content, a release identifier associated with the content, and a version associated with the content. The one or more instructions may cause the one or more processors to securely store the content and the content information, and reconfigure the content for the different computing platforms, based on the request and based on the content information, to generate different reconfigured content. The one or more instructions may cause the one or more processors to compile the different reconfigured content to generate different compiled content for the different computing platforms, and provide at least one of the different compiled content to a client device associated with at least one of the different computing platforms.

According to some implementations, a method may include receiving, by device, a request to configure and compile content for different computing platforms, and receiving, by the device, the content and content information associated with the content, where the content information includes metadata associated with the content, a release identifier associated with the content, and a version associated with the content. The method may include reconfiguring, by the device, the content for the different computing platforms, based on the request and based on the content information, to generate different reconfigured content, and determining, by the device, whether the different reconfigured content requires activation of a license. The method may include obtaining, by the device, the license when the different reconfigured content requires activation of the license, and activating, by the device, the license for the different reconfigured content. The method may include compiling, by the device, the different reconfigured content to generate different compiled content for the different computing platforms, and providing, by the device, at least one of the different compiled content to a client device associated with at least one of the different computing platforms.

DETAILED DESCRIPTION

The following detailed description of example implementations refers to the accompanying drawings. The same reference numbers in different drawings may identify the same or similar elements.

Configuring and bundling content for different types of computing platforms requires a developer to understand the different hardware platforms (e.g., 32-bit architectures, 64-bit architectures, and/or the like) and the different software platforms (e.g., video game platforms, a Windows™ operating system (OS), an Apple™ operating system (iOS), and/or the like). Thus, there are many different types of computing platforms, hardware platforms, and software platforms. However, configuring and bundling content for many different types of computing platforms is time consuming for the developer, consumes resources (e.g., processors, memories, and/or the like), and takes the developer away from improving the content and/or creating new content.

Some implementations described herein provide a content publishing platform that automatically configures and compiles (e.g., packages content into machine-understandable code or data structures, translates a higher-level language to a lower-level machine-readable code, bundles graphical, audio, video, and/or other content into packages which may be .exe, .zip or any other encoding, and/or the like) content for multiple diverse computing platforms. For example, the content publishing platform may receive content and a request to publish the content to multiple different platforms (e.g., computing platforms), and may configure the content for the different platforms to generate different content configurations. The content publishing platform may compile the different content configurations to generate different compiled content for the different platforms, and may modify one or more of the different compiled content if the one or more of the different compiled content includes duplicate information (e.g., information that is the same as information previously published by the content publishing platform). The content publishing platform may determine whether licenses are provided for the different compiled content, and may retrieve any necessary licenses for the different compiled content. The content publishing platform may provide the different compiled content to different client devices corresponding with the different platforms.

Figure 1A:
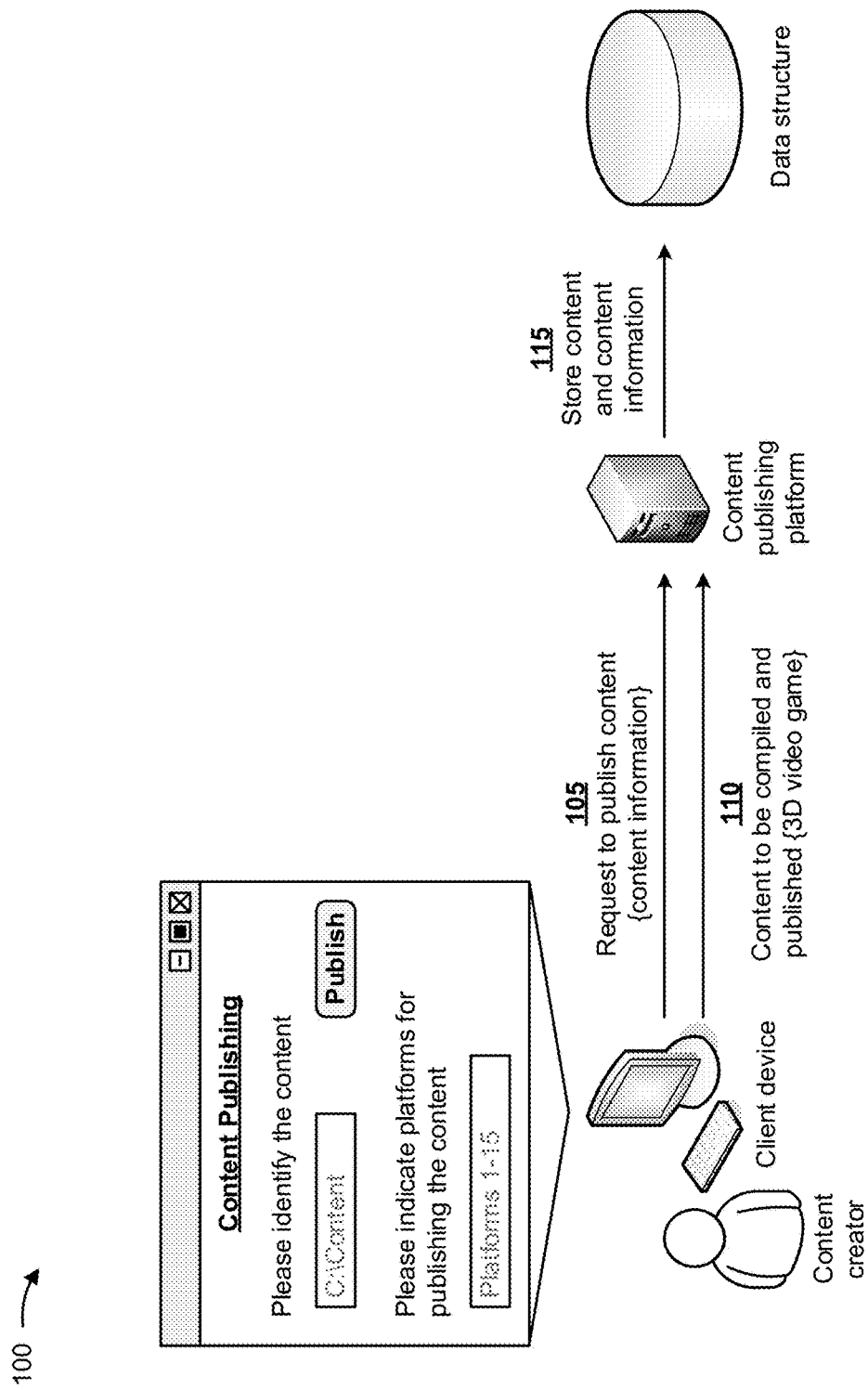
FIGS. 1A-1H are diagrams of an overview of an example implementation described herein.

FIGS. 1A-1H are diagrams of an overview of an example implementation 100 described herein. As shown in FIG. 1A, a client device may be associated with a content publishing platform. Assume that a content creator associated with the client device has created content (e.g., a 3D video game or a simulation) and wishes to publish the content to multiple different platforms (e.g., computing platforms). In some implementations, the content creator may utilize the client device to access a content publishing application provided by the content publishing platform. In such implementations, the content creator may provide, via the client device, credentials (e.g., a user name, a password, and/or the like) for accessing the content publishing application. The content publishing platform may receive the credentials, and may authenticate the credentials prior to providing the client device with access to the content publishing application. In the content publishing platform authenticates the credentials, the content publishing platform may provide a user interface of the content publishing application, for display, to the client device. The user interface may include information requesting the content creator to identify content to be published (e.g., "C:\Content," a 3D video game), information requesting the content creator to identify platforms to which the content is to be published (e.g., platforms 1-15), and/or the like.

As further shown in FIG. 1A, and by reference number 105, when the content creator selects a "Publish" button (e.g., or some other mechanism), the client device may provide, to the content publishing platform, a request to create to publish the content, and the content publishing platform may receive the request to publish the content. In some implementations, the request to publish the content may include content information, such as labeled categories of information indicating the content creator's user name and password, metadata associated with the content (e.g., platforms to which the content is to be published, one or more game bundles associated with the content, one or more scenes associated with the content, and/or the like), a release identifier for the content, a reference number for the request, a version of the content, and/or the like. In some implementations, the platforms may include hardware platforms (e.g., x86 architectures, 32-bit architectures, 64-bit architectures, and/or the like), software platforms (e.g., Android™, iOS™, Microsoft Windows™, Java™, Linux™, macOS™, PlayStation 4™, and/or the like), virtual platforms, and/or combinations hardware, software, and virtual platforms.

As further shown in FIG. 1A, and by reference number 110, when the content creator selects the "Publish" button, the client device may provide the content (e.g., a 3D video game to be compiled and published the platforms identified by the content creator) to the content publishing platform. In some implementations, the content may include software (e.g., word processing software, email software, data processing software, financial software, and/or the like), a video game (e.g., a 2D video game, a 3D video game, a virtual reality video game, and/or the like), a simulation (e.g., a video game simulation, a training scenario simulation, a guided tour simulation, a simulation of a factory tour, a simulation of an assembly process, a simulation of a medical procedure, a flight to Mars simulation, a big-data visualization, an artistic expression simulation, and/or the like), a video, audio files, and/or the like.

As further shown in FIG. 1A, and by reference number 115, based on the request to publish the content, the content publishing platform may store the content and the content information in a data structure associated with the content publishing platform. In some implementations, the data structure, and other data structures described herein, may include a database, a table, a linked-list, a tree, and/or the like. In some implementations, the content publishing platform may store the content and the content information in the data structure for later processing by the content publishing platform.

Figure 1B:
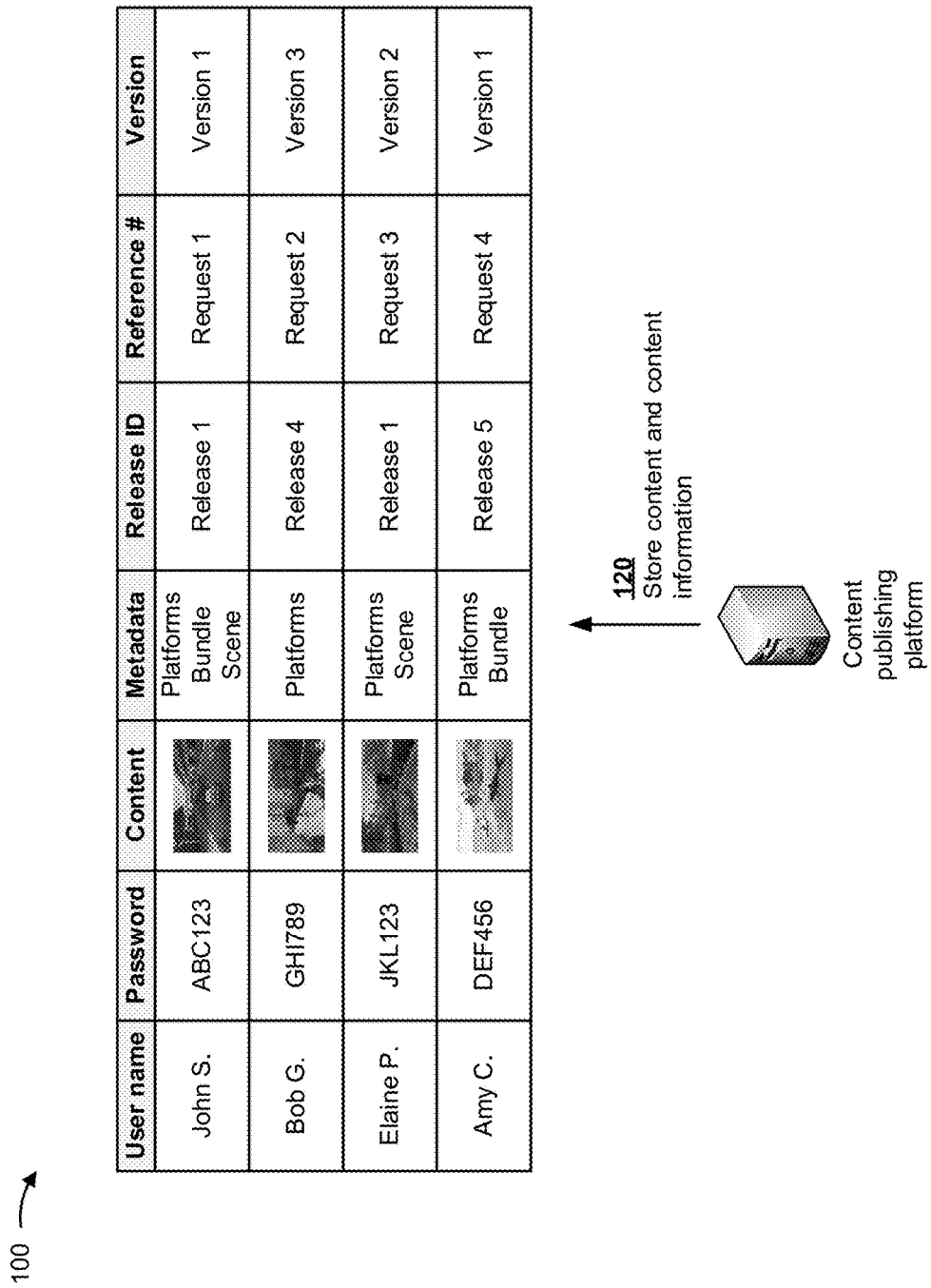

As shown in FIG. 1B, and by reference number 120, the content publishing platform may store the content and the content information in a database that includes a user name field, a password field, a content field, a metadata field, a release identifier (ID) field, a reference number field, a version field, and/or the like. In some implementations, the user name field may include user names associated with users of the content publishing platform (e.g., John S., Bob G., Elaine P., or Amy C.), the password field may include passwords associated with the user names (e.g., ABC123, GHI789, JKL12, or DEF456), the content field may include the content uploaded to the content publishing platform (e.g., video games, software, and/or the like), the metadata field may include the metadata of the content (e.g., platforms to which to publish the content, bundles associated with the content, scenes associated with the content, and/or the like), the release identifier field may include release identifiers associated with the content, the reference number field may include reference numbers associated with requests to publish the content, the version field may include versions associated with the content, and/or the like.

In some implementations, the content publishing platform may securely store the content and the content information by encrypting the content and the content information using an encryption technology. For example, the content and the content information may be securely stored using symmetric-key (or single-key) encryption technology. Using symmetric-key encryption technology, a single key, which is shared by the content publishing platform and a user, may be used to encrypt and decrypt the content and the content information. Example symmetric-key technologies may include the advanced encryption standard (AES), the data encryption standard (DES), the triple DES (3DES), Serpent, Twofish, blowfish, CAST5, RC4, the international data encryption algorithm (IDEA), and/or the like.

In some implementations, the content and the content information may be securely stored using asymmetric-key (or public-key-private-key) encryption technology. Using asymmetric-key encryption technology, information may be encrypted with a private key, and decrypted with a public key, to verify that the information was encrypted using the corresponding private key. Example asymmetric-key encryption technologies may include digital signal algorithm (DSA), Rivest-Shamir-Adleman (RSA), Diffie-Hellman key exchange, key serialization, asymmetric utilities, X25519 key exchange, and/or the like.

In some implementations, the content and the content information may be securely stored by applying a cryptographic hash function to the content and the content information. The cryptographic hash function may be used to verify integrity of files and/or messages, verify passwords, and/or the like. Example cryptographic hash functions may include secure hash algorithm 1 (SHA-1), secure hash algorithm 2 (SHA-2), secure hash algorithm 3 (SHA-3), message digest 5 (MD5), BLAKE2, and/or the like.

In some implementations, the content publishing platform may only encrypt the content that is uploaded to the content publishing platform. In some implementations, the content publishing platform may back up the content and the content information. Backing up of the content and the content information may be performed manually, automatically, on a regular basis, and/or according to a schedule.

Figure 1C:
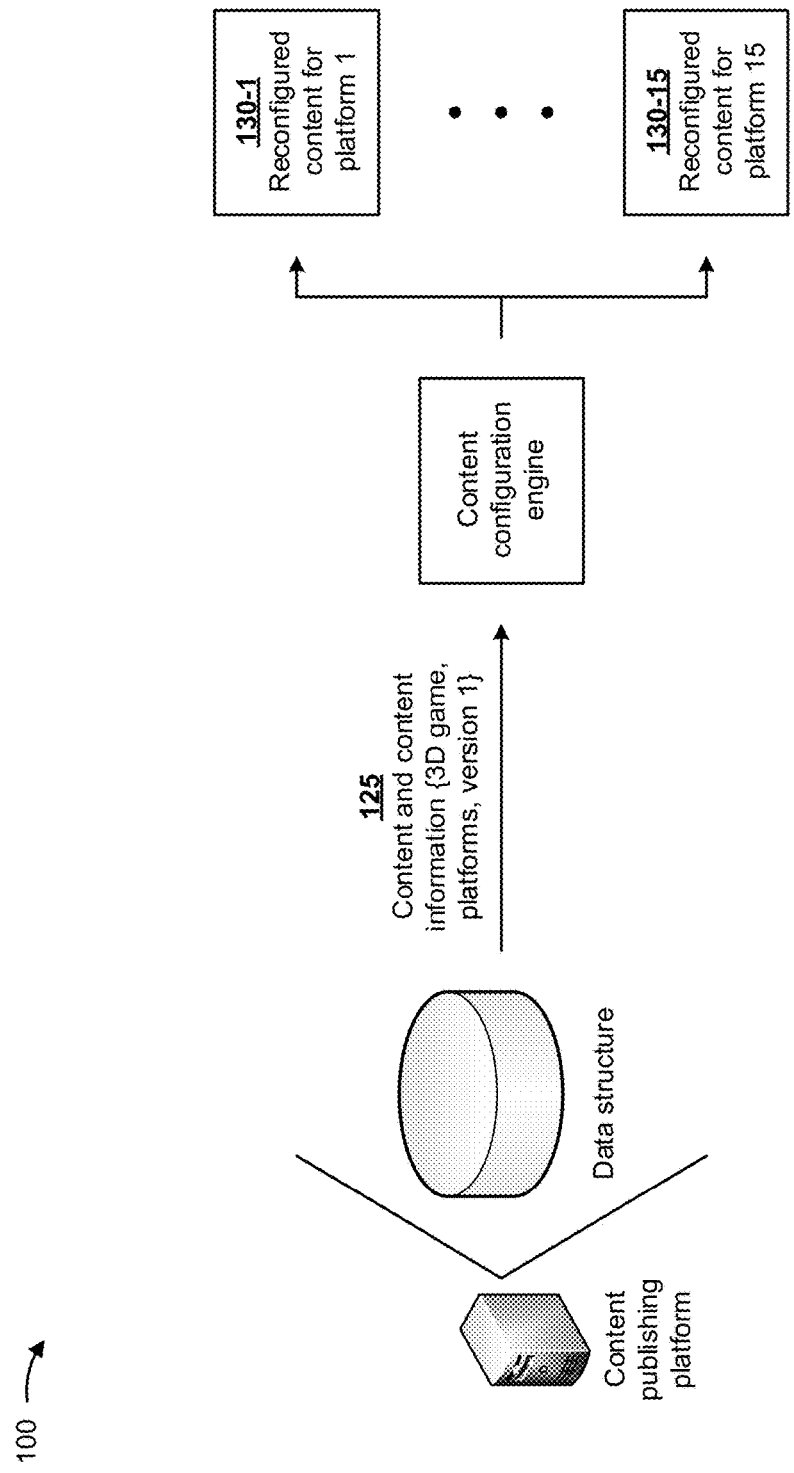

As shown in FIG. 1C, and by reference number 125, a content configuration engine, of the content publishing platform, may retrieve or receive the content (e.g., the 3D video game) and the content information (e.g., the platforms to which the 3D video game is to be published, the version of the 3D video game, and/or the like) from the data structure. In some implementations, the content configuration engine may reconfigure the content, based on the platforms to which the content is to be published, in order to generate reconfigured content for each of the platforms to which the content is to be published. For example, as shown by reference numbers 130-1 through 130-15 of FIG. 1C, the content configuration engine may generate reconfigured content for each of the fifteen platforms to which the content is to be published. In some implementations, the content configuration engine may reconfigure the content for each platform in parallel, sequentially, and/or the like.

In some implementations, the content configuration engine may generate each reconfigured content for a corresponding platform by adapting the content (e.g., the source code of the content) for the purpose of achieving execution on the corresponding platform. In such implementations, the content configuration engine may adapt the content for hardware associated with the corresponding platform (e.g., a central processing unit (CPU), a graphic processing unit (GPU), memory, and/or the like), software associated with the corresponding platform (e.g., an operating system), and/or other features associated with the corresponding platform (e.g., a third party library, video capabilities, audio capabilities, and/or the like).

In some implementations, the content configuration engine may recompile the source code for the content, may rewrite one or more portions of the source code for the content, may change one or more sizes, colors, shapes, layouts, and/or the like of graphics output by content, and/or the like in order to generate each reconfigured content for a corresponding platform. In some implementations, the content configuration engine, when generating each reconfigured content for a corresponding platform, may check options used to preprocess, compile, load, and/or execute the source code of the content for the corresponding platform to ensure a same default behavior is occurring (e.g., this may include checking variables, path, and/or library path settings for the corresponding platform); may determine each option used by the source code (e.g., since use of an option can change a way the source code is built and can change a behavior of the source code), and may ensure that the used options are interpreted in the same way by the corresponding platform; may check a level of precision of the source code (e.g., how many bits are used in integer arithmetic, how many bits are used for real and double precision arithmetic, and/or the like); may determine if default levels of optimization of the source code will be overridden by the corresponding platform, and may lower the level of optimization for the corresponding platform; may check how string constants are handled; may determine if variables are initialized (or are not initialized) during creation of the source code (e.g., setting default values to zero, null, or another value); may check how logical values are determined by the corresponding platform (e.g., determining if values with be evaluated to true and false on the corresponding platform); may determine whether exception handlers are or are not enabled by default in the corresponding platform; may determine whether stack or static storage of variable values is used by the source code; may determine whether there are any options used by the source code that might cause parallel execution using threads or other parallel execution models; may determine where there are any options or default behaviors used by the source code that could cause utilization of different rounding methods; and/or the like.

In some implementations, when generating each reconfigured content, the content configuration engine may not modify a portion of the source code of the content that is associated with core functionality, but may modify a portion of the source code that is associated with platform functionality. Core functionality may include the portion of the source code that is platform independent, such as patented or common algorithms and other basic functionalities that define how the content behaves. Platform functionality may include the portion of the source code that defines specific characteristics regarding a corresponding platform, such as source code associated with presentation of information through a user interface.

In some implementations, when generating each reconfigured content, the content configuration engine may specify symbols, in the source code of the content, on which to perform conditional compilation, may define debug and/or trace as symbols in the source code of the content, may specify a processor of the platform to which the content is to be published, may allow source code that uses unsafe keywords to compile, may enable or disable optimizations that make the reconfigured content smaller, faster, and more efficient than the content, and/or the like.

Figure 1D:
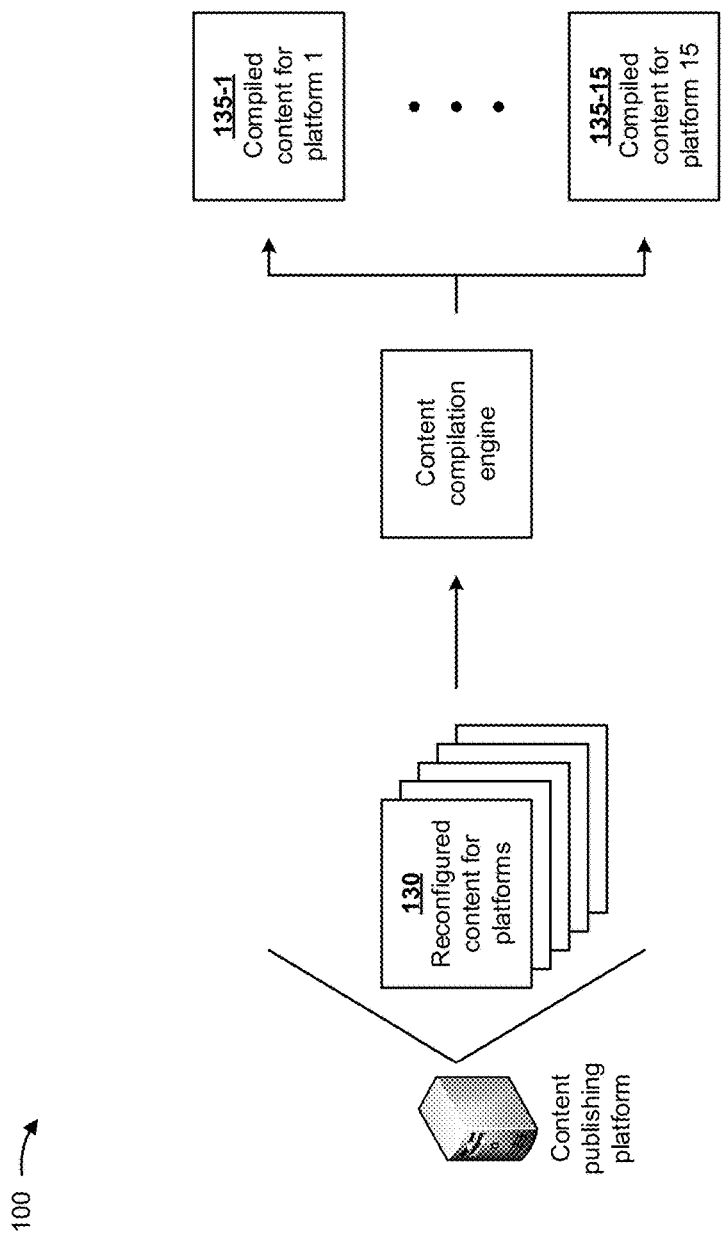

As shown in FIG. 1D, a content compilation engine, of the content publishing platform, may retrieve or receive the configured content for the different platforms. In some implementations, the content compilation engine may compile the reconfigured for the different platforms in order to generate compiled content for the different platforms. For example, as shown by reference numbers 135-1 through 135-15 of FIG. 1D, the content compilation engine may generate compiled content for each of the fifteen platforms to which the content is to be published. In some implementations, the content compilation engine may compile the reconfigured content for each platform in parallel, sequentially, and/or the like.

In some implementations, the content compilation engine, when bundling reconfigured content for a particular platform, may transform the reconfigured content (e.g., written in a source programming language) into another programming language that may be understood by the particular platform. In some implementations, the content compilation engine may include multiple native compilers, where each native compiler corresponds to one of the multiple platforms (e.g., a mobile device platform, a desktop computer platform, and/or the like) to which content is to be published. For example, if the reconfigured content is to be utilized by an Android™-based smart phone, the content compilation engine may utilize a native compiler that is utilized by an Android™-based smart phone.

In some implementations, the content compilation engine may include multiple cross compilers, where each cross compiler corresponds to one of the multiple platforms to which content is to be published. In some implementations, the content compilation engine may include multiple virtual machine compilers, where each virtual machine compiler corresponds to virtual machine to which content is to be published. In some implementations, the content compilation engine may include a combination of one or more native compilers, one or more cross compilers, and one or more virtual machine compilers.

In some implementations, the content compilation engine may include a front end stage, a middle stage, and a back end stage. The front end stage may verify syntax and semantics of the reconfigured content according to a source language of the reconfigured content. For statically typed languages, the front end stage may perform type checking by collecting type information. If the reconfigured content is syntactically incorrect or has a type error, the front end stage may generate errors and warnings, and may highlight the errors and warnings in the reconfigured content. In some implementations, the front end stage may perform a lexical analysis, a syntax analysis, a semantic analysis, and/or the like on the reconfigured content. The front end stage may transform the reconfigured content into an intermediate representation for further processing by the middle stage. The intermediate representation may include a lower-level representation of the reconfigured content.

The middle stage may perform optimizations on the intermediate representation that are independent of a platform to which the content is to be published. Examples of middle stage optimizations may include removal of useless code in the reconfigured content (e.g., dead code elimination), removal of unreachable code in the reconfigured content (e.g., a reachability analysis), discovery and propagation of constant values (e.g., constant propagation), relocation of a computation to a less frequently executed place (e.g., out of a loop), specialization of a computation based on a context, and/or the like. The middle stage may produce an optimized intermediate representation that may be utilized by the back end stage.

The back end stage may receive the optimized intermediate representation from the middle stage, and may perform more analysis, transformations, optimizations, and/or the like that are specific for a platform to which the content is to be published. The back end stage may generate a target-dependent assembly code, and may perform register allocation. The back end stage may perform instruction scheduling, which reorders instructions to maintain parallel execution. The back end stage may output machine code specialized for a platform to which the content is to be published.

In some implementations, the content publishing platform may perform one or more debugging techniques on the compiled content for the platforms to ensure that the compiled content is operating correctly. The one or more debugging techniques may include interactive debugging, print debugging or tracing (e.g., using trace statements to indicate a flow of execution), remote debugging (e.g., debugging a program executing on a system different from the debugger), post-mortem debugging (e.g., debugging a program after the program has crashed), delta debugging (e.g., automating test case simplification), and/or the like.

Figure 1E:
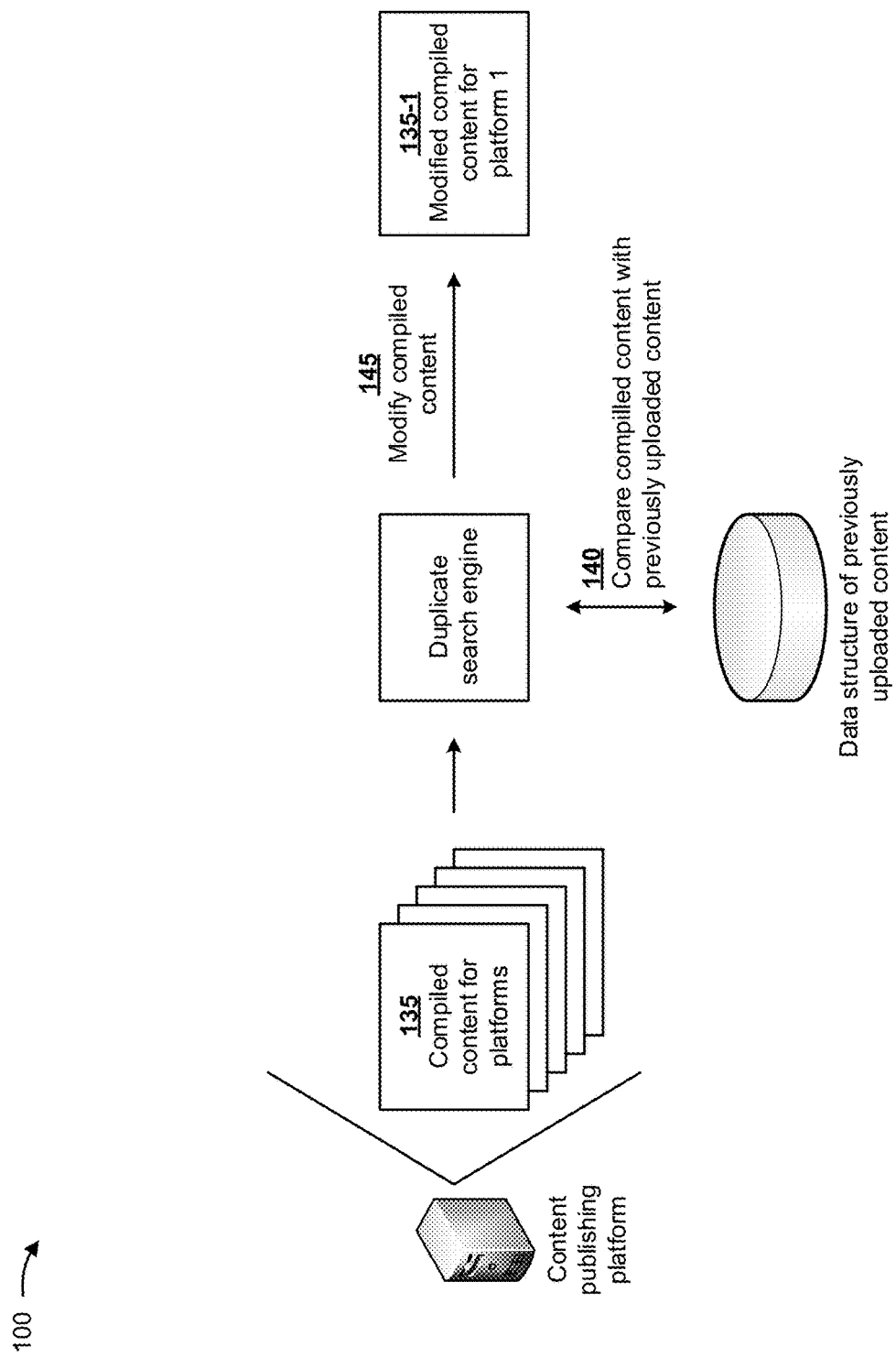

As shown in FIG. 1E, and by reference number 140, a duplicate search engine, of the content publishing platform, may retrieve or receive the compiled content for the platforms, and may compare the compiled content with previously published or uploaded content. In some implementations, the content publishing platform may store the previously uploaded content in a data structure (e.g., associated with the content publishing platform), and the previously uploaded content may include one or more portions of previously uploaded content, one or more previous versions of content, one or more previous releases of content, and/or the like. For example, if the content creator is uploading a second version of a second release of a video game, the duplicate search engine may compare the second version of the second release of the video game to all versions associated with a first release of the video game and to a first version of the second release of the video game.

In some implementations, if the duplicate search engine finds a portion of the compiled content that matches previously uploaded content, the duplicate search engine may modify the compiled content to remove the portion of the compiled content in order prevent re-uploading of the previously uploaded content (e.g., to eliminate duplicate information). For example, as shown in FIG. 1E, and by reference number 145, the duplicate search engine may determine that a portion of the compiled content for platform 1 matches previously uploaded content, and may modify the compiled content for platform 1 to prevent the portion of the compiled content for platform 1 from being uploaded (e.g., to prevent re-uploading duplicate content if only one portion of the content is changed). This may save time and conserve resources associated with publishing or uploading the compiled content.

Figure 1F:
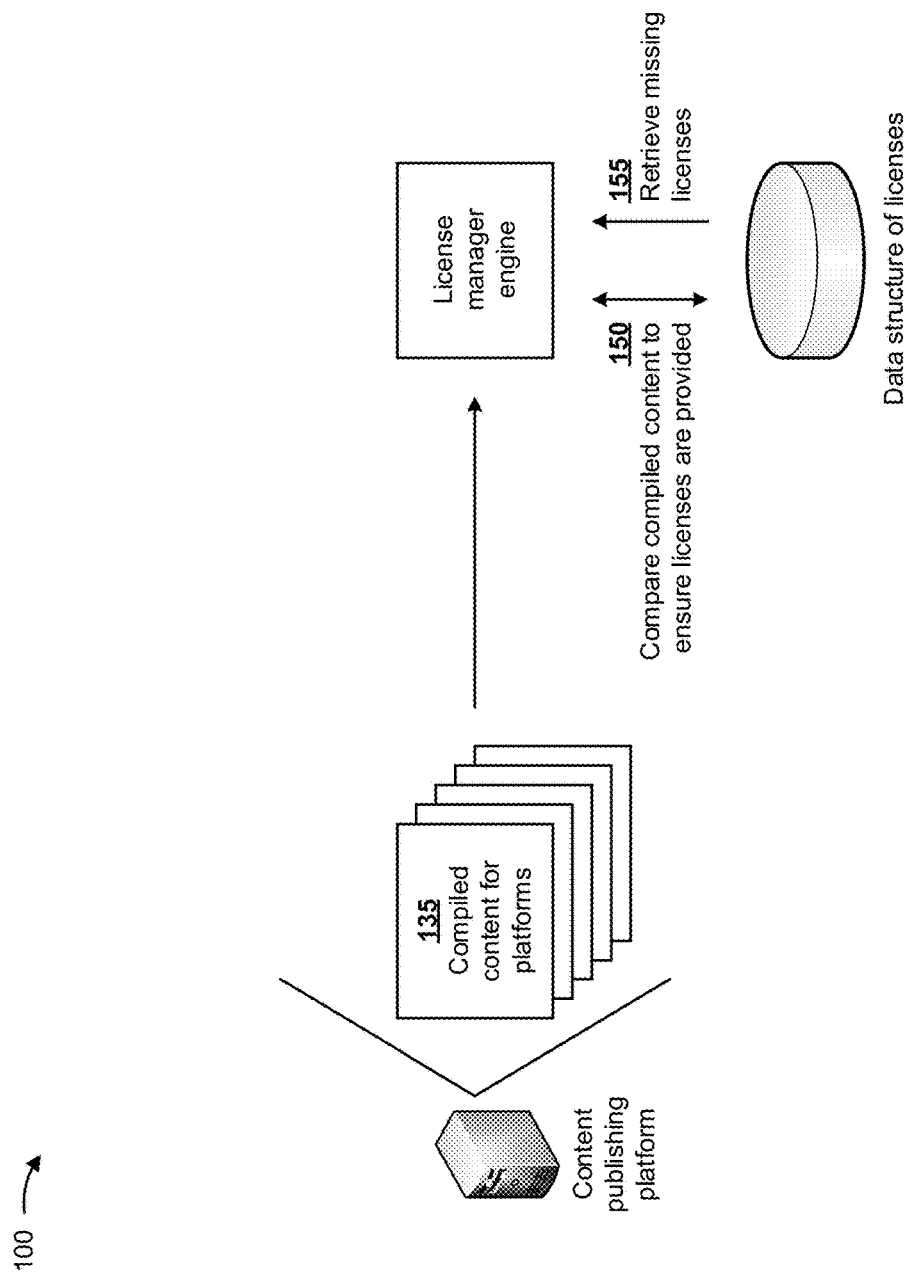

As shown in FIG. 1F, and by reference number 150, a license manager engine, of the content publishing platform, may retrieve or receive the compiled content for the platforms, and may compare the compiled content for the platforms with license information provided in a data structure (e.g., associated with the content publishing platform) to ensure that licenses are provided for the compiled content. In some implementations, the license manager engine may compare the compiled content with the license information in order to determine whether the compiled content violates any licenses and/or requires any licenses. In some implementations, and as shown by reference number 155 of FIG. 155, if the license manager engine determines that the compiled content violates a license or requires a license, the license manager engine may retrieve or obtain the license and may activate the license.

In some implementations, the license manager engine may retrieve or receive the reconfigured content, and may perform the functions described above for the compiled content if licenses are needed prior to bundling the reconfigured content (e.g., if the licenses need to be activated when bundling the reconfigured content).

Figure 1G:
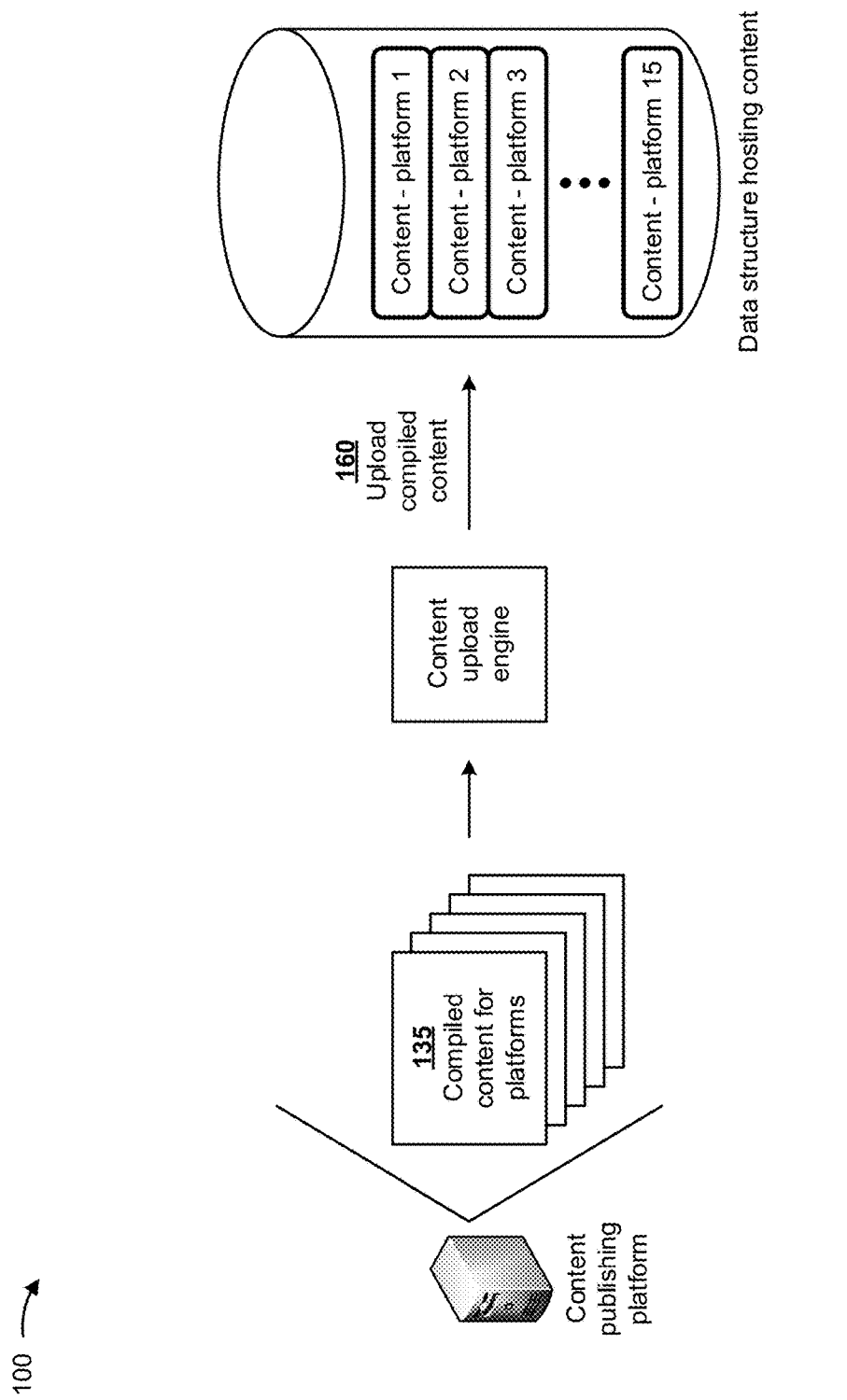

As shown in FIG. 1G, and by reference number 160, a content upload engine, of the content publishing platform, may retrieve or receive the compiled content for the platforms, and may upload the compiled content for the platforms to a data structure hosting content (e.g., associated with the content publishing platform). For example, as shown in FIG. 1G, the data structure hosting content may store the compiled content for platform 1, the compiled content for platform 2, and the compiled content for platform 15. In some implementations, the data structure hosting content may enable the content publishing platform to provide the content to client devices associated with the fifteen platforms designed by the content creator.

Figure 1H:
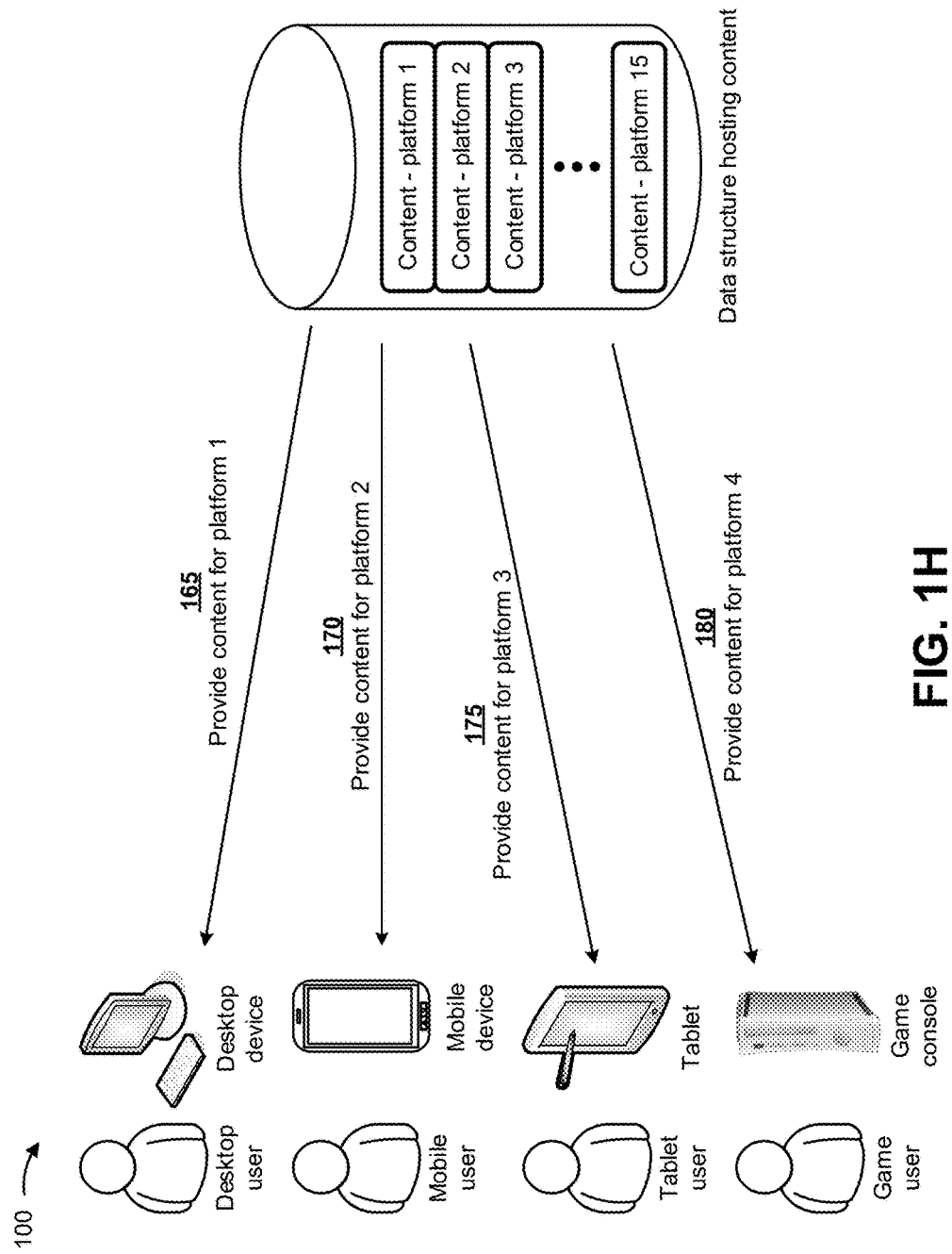

As shown in FIG. 1H, a desktop user associated with a desktop computer (e.g., a client device associated with platform 1) may access the content publishing platform (e.g., via credentials and authentication), and may request the content, provided by the content creator, from the content publishing platform. As further shown in FIG. 1H, and by reference number 165, the content publishing platform may provide the content for platform 1, from the data structure hosting content, to the desktop computer, and the desktop computer may display the content (e.g., the 3D video game) to the desktop user.

As shown in FIG. 1H, a mobile user associated with a mobile device (e.g., a client device associated with platform 2) may access the content publishing platform (e.g., via credentials and authentication), and may request the content, provided by the content creator, from the content publishing platform. As further shown in FIG. 1H, and by reference number 170, the content publishing platform may provide the content for platform 2, from the data structure hosting content, to the mobile device, and the mobile device may display the content (e.g., the 3D video game) to the mobile user.

As shown in FIG. 1H, a tablet user associated with a tablet computer (e.g., a client device associated with platform 3) may access the content publishing platform (e.g., via credentials and authentication), and may request the content, provided by the content creator, from the content publishing platform. As further shown in FIG. 1H, and by reference number 175, the content publishing platform may provide the content for platform 3, from the data structure hosting content, to the tablet computer, and the tablet computer may display the content (e.g., the 3D video game) to the tablet user.

As shown in FIG. 1H, a game user associated with a game console (e.g., a client device associated with platform 4) may access the content publishing platform (e.g., via credentials and authentication), and may request the content, provided by the content creator, from the content publishing platform. As further shown in FIG. 1H, and by reference number 180, the content publishing platform may provide the content for platform 4, from the data structure hosting content, to the game console, and the game console may display the content (e.g., the 3D video game) to the game user.

In some implementations, the content publishing platform may publish content that may be utilized by to one or more users and/or client devices connected to the same content. In such implementations, the content publishing platform may deliver the content to one user (e.g., client device), and/or to multiple users (e.g., multiple client devices) who may or may not be able to interact with one another in real time or asynchronously. For example, the multiple users may be utilizing a same guided-tour, may be cooperating in assembly of virtual objects in real time, and may be able to leave notes that may persist on the content publishing platform for later access by the multiple users, other users, and/or an automated system.

In this way, several different stages of the process for configuring and bundling content for multiple diverse computing platforms are automated, which may remove human subjectivity and waste from the process, and which may improve speed and efficiency of the process and conserve computing resources (e.g., processors, memory, and/or the like). Furthermore, implementations described herein use a rigorous, computerized process to perform tasks or roles that were previously performed using subjective human intuition or input, or were unable to be performed by humans. These roles may include reconfiguring content for every possible computing platform, bundling the reconfigured content for every possible computing platform, and/or providing the compiled and reconfigured to every possible computing platform.

As indicated above, FIGS. 1A-1H are provided merely as examples. Other examples are possible and may differ from what was described with regard to FIGS. 1A-1H.

Figure 2:
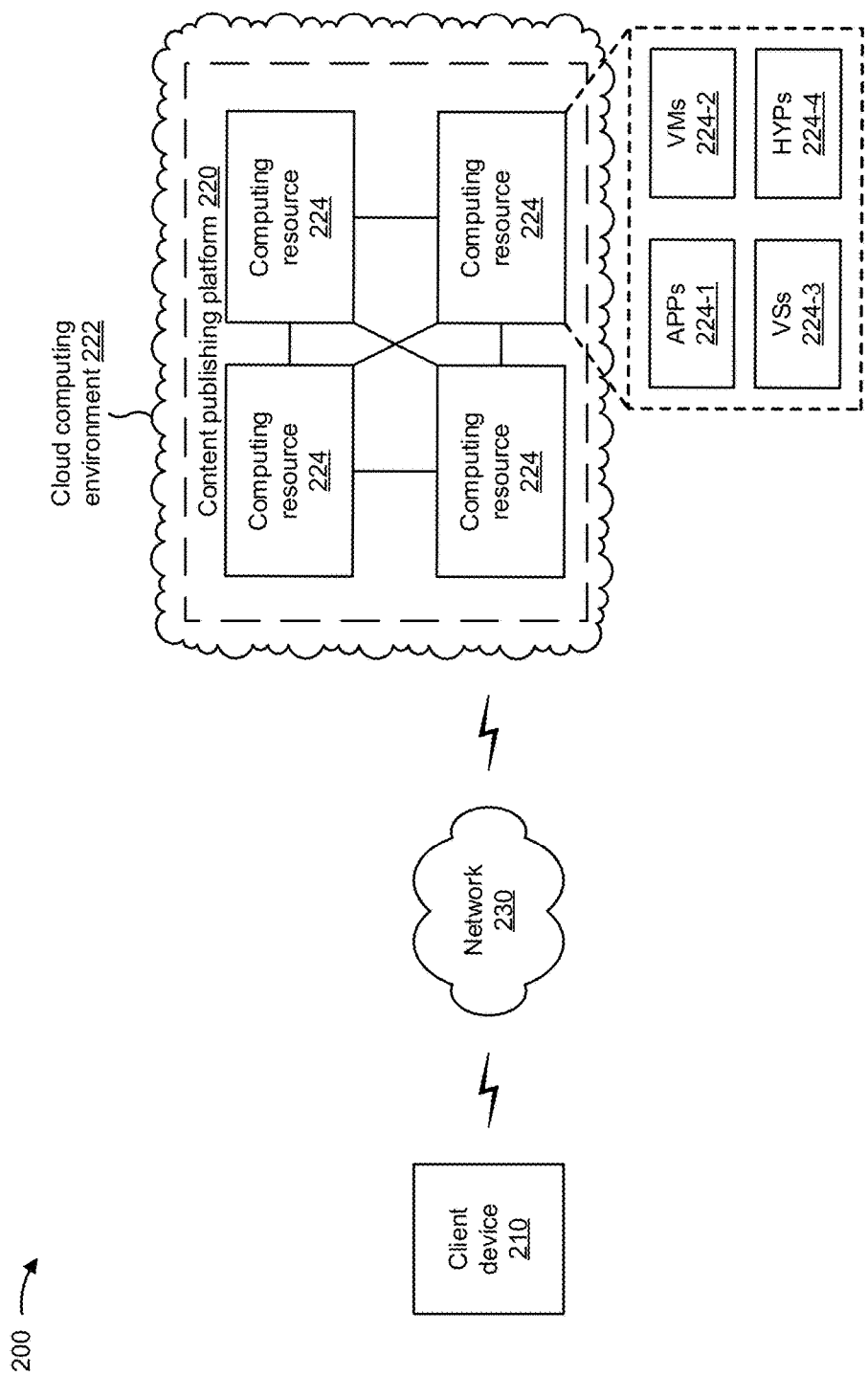
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a content publishing platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, a head mounted device (HMD), etc.), or a similar type of device. In some implementations, client device 210 may receive information from and/or transmit information to content publishing platform 220.

Content publishing platform 220 includes one or more devices that automatically configure and compile content for multiple diverse computing platforms. In some implementations, content publishing platform 220 may be designed to be modular such that certain software components may be swapped in or out depending on a particular need. As such, content publishing platform 220 may be easily and/or quickly reconfigured for different uses. In some implementations, content publishing platform 220 may receive information from and/or transmit information to one or more client devices 210.

In some implementations, as shown, content publishing platform 220 may be hosted in a cloud computing environment 222. Notably, while implementations described herein describe content publishing platform 220 as being hosted in cloud computing environment 222, in some implementations, content publishing platform 220 may not be cloud-based (i.e., may be implemented outside of a cloud computing environment) or may be partially cloud-based.

Cloud computing environment 222 includes an environment that hosts content publishing platform 220. Cloud computing environment 222 may provide computation, software, data access, storage, etc. services that do not require end-user knowledge of a physical location and configuration of system(s) and/or device(s) that hosts content publishing platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host content publishing platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with content publishing platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of content publishing platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
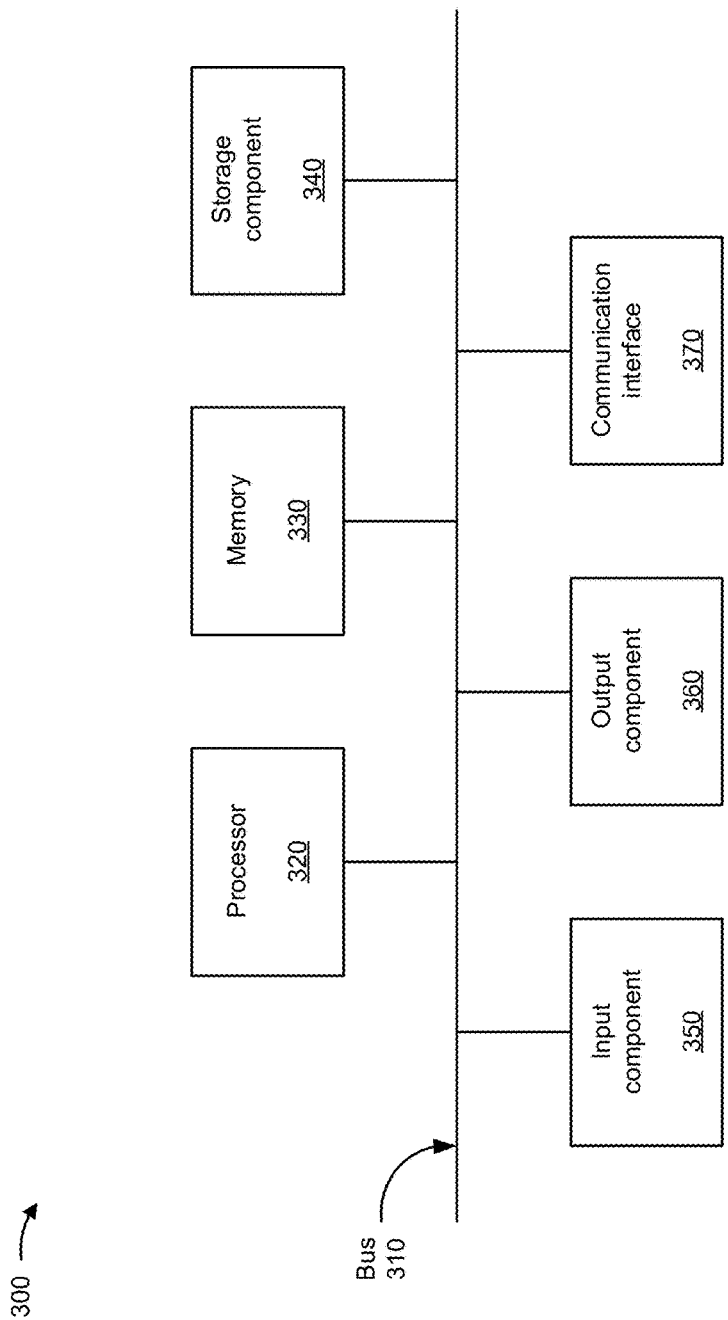
FIG. 3 is a diagram of example components of one or more devices of FIG. 2.

FIG. 3 is a diagram of example components of a device 300. Device 300 may correspond to client device 210, content publishing platform 220, and/or computing resource 224. In some implementations, client device 210, content publishing platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
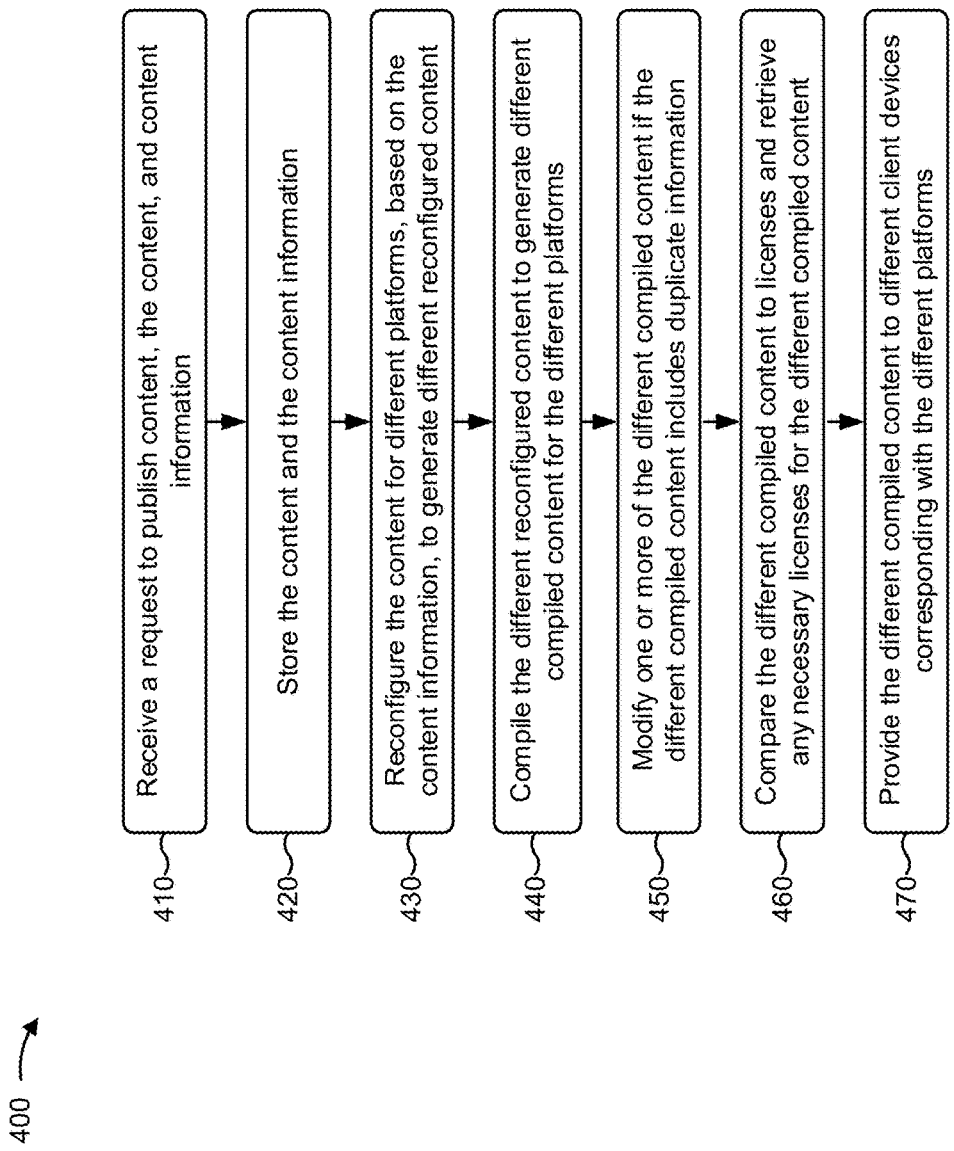
FIG. 4 is a flow chart of an example process for automatically configuring and bundling content for multiple diverse computing platforms.

FIG. 4 is a flow chart of an example process 400 for automatically configuring and bundling content for multiple diverse computing platforms. In some implementations, one or more process blocks of FIG. 4 may be performed by content publishing platform 220. In some implementations, one or more process blocks of FIG. 4 may be performed by another device or a group of devices separate from or including content publishing platform 220, such as client device 210.

As shown in FIG. 4, process 400 may include receiving a request to publish content, the content, and content information (block 410). For example, content publishing platform 220 (e.g., using computing resource 224, processor 320, and/or the like) may receive, from client device 210, a request to publish content, the content, and content information. In some implementations, a content creator may cause client device 210 to provide, to content publishing platform 220, a request to create to publish content, and content publishing platform 220 may receive the request to publish the content. In some implementations, the request to publish the content may include content information, such as information indicating the content creator's user name and password, metadata associated with the content (e.g., platforms to which the content is to be published, one or more game bundles associated with the content, one or more scenes associated with the content, and/or the like), a release identifier for the content, a reference number for the request, a version of the content, and/or the like. In some implementations, the platforms may include hardware platforms (e.g., x86 architectures, 32-bit architectures, 64-bit architectures, and/or the like), software platforms (e.g., Android™, iOS™ Microsoft Windows™, Java™, Linux™, macOS™, PlayStation 4™, and/or the like), virtual platforms, and/or combinations hardware, software, and virtual platforms.

In some implementations, client device 210 may provide the content to content publishing platform 220, and the content publishing platform 220 may receive the content. In some implementations, the content may include software (e.g., word processing software, email software, data processing software, financial software, and/or the like), a video game (e.g., a 2D video game, a 3D video game, a virtual reality video game, and/or the like), a video, audio files, and/or the like.

In this way, content publishing platform 220 may receive, from client device 210, the request to publish the content, the content, and the content information.

As further shown in FIG. 4, process 400 may include storing the content and the content information (block 420). For example, content publishing platform 220 (e.g., using computing resource 224, processor 320, and/or the like) may store the content and the content information. In some implementations, based on the request to publish the content, content publishing platform 220 may store the content and the content information in a data structure associated with content publishing platform 220. In some implementations, content publishing platform 220 may store the content and the content information in a database that includes a user name field, a password field, a content field, a metadata field, a release identifier (ID) field, a reference number field, a version field, and/or the like. In some implementations, the user name field may include user names associated with users of the content publishing platform, the password field may include passwords associated with the user names, the content field may include the content uploaded to content publishing platform 220, the metadata field may include the metadata of the content (e.g., platforms to which to publish the content, bundles associated with the content, scenes associated with the content, and/or the like), the release identifier field may include release identifiers associated with the content, the reference number field may include reference numbers associated with requests to publish the content, the version field may include versions associated with the content, and/or the like.

In some implementations, content publishing platform 220 may securely store the content and the content information by encrypting the content and the content information using an encryption technology and/or other security techniques.

In this way, content publishing platform 220 may store the content and the content information.

As further shown in FIG. 4, process 400 may include reconfiguring the content for different platforms, based on the content information, to generate different reconfigured content (block 430). For example, content publishing platform 220 (e.g., using computing resource 224, processor 320, and/or the like) may reconfigure the content for different platforms, based on the content information, to generate different reconfigured content. In some implementations, a content configuration engine, of content publishing platform 220, may retrieve or receive the content and the content information from the data structure. In some implementations, the content configuration engine may reconfigure the content, based on the platforms to which the content is to be published, in order to generate reconfigured content for each of the platforms to which the content is to be published. In some implementations, the content configuration engine may reconfigure the content for each platform in parallel, sequentially, and/or the like.

In some implementations, the content configuration engine may generate each reconfigured content for a corresponding platform by adapting the content (e.g., the source code of the content) for the purpose of achieving execution on the corresponding platform. In such implementations, the content configuration engine may adapt the content for hardware associated with the corresponding platform, software associated with the corresponding platform, and/or other features associated with the corresponding platform (e.g., a third party library, video capabilities, audio capabilities, and/or the like).

In some implementations, the content configuration engine may recompile the source code for the content, may rewrite one or more portions of the source code for the content, may change one or more sizes, colors, shapes, layouts, and/or the like of graphics output by content, and/or the like in order to generate each reconfigured content for a corresponding platform. In some implementations, when generating each reconfigured content, the content configuration engine may not modify a portion of the source code of the content that is associated with core functionality, but may modify a portion of the source code that is associated with platform functionality. Core functionality may include the portion of the source code that is platform independent, such as patented or common algorithms and other basic functionalities that define how the content behaves. Platform functionality may include the portion of the source code that defines specific characteristics regarding a corresponding platform, such as source code associated with presentation of information through a user interface.

In this way, content publishing platform 220 may reconfigure the content for the different platforms, based on the content information, to generate the different reconfigured content.

As further shown in FIG. 4, process 400 may include bundling the different reconfigured content to generate different compiled content for the different platforms (block 440). For example, content publishing platform 220 (e.g., using computing resource 224, processor 320, and/or the like) may compile the different reconfigured content to generate different compiled content for the different platforms. In some implementations, a content compilation engine, of content publishing platform 220, may retrieve or receive the reconfigured content for the different platforms. In some implementations, the content compilation engine may compile the reconfigured content for the different platforms in order to generate compiled content for the different platforms. In some implementations, the content compilation engine may compile the reconfigured content for each platform in parallel, sequentially, and/or the like.

In some implementations, the content compilation engine, when bundling reconfigured content for a particular platform, may transform the reconfigured content (e.g., written in a source programming language) into another programming language that may be understood by the particular platform. In some implementations, the content compilation engine may include multiple native compilers, where each native compiler corresponds to one of the multiple platforms to which content is to be published. For example, if the reconfigured content is to be utilized by an Android™-based smart phone, the content compilation engine may utilize a native compiler that is utilized by an Android™-based smart phone.

In some implementations, the content compilation engine may include multiple cross compilers, where each cross compiler corresponds to one of the multiple platforms to which content is to be published. In some implementations, the content compilation engine may include multiple virtual machine compilers, where each virtual machine compiler corresponds to virtual machine to which content is to be published. In some implementations, the content compilation engine may include a combination of one or more native compilers, one or more cross compilers, and one or more virtual machine compilers.

In some implementations, the content compilation engine may include a front end stage, a middle stage, and a back end stage. The front end stage may verify syntax and semantics of the reconfigured content according to a source language of the reconfigured content. For statically typed languages, the front end stage may perform type checking by collecting type information. If the content is syntactically incorrect or has a type error, the front end stage may generate errors and warnings, and may highlight the errors and warnings in the reconfigured content. In some implementations, the front end stage may perform a lexical analysis, a syntax analysis, a semantic analysis, and/or the like on the reconfigured content. The front end stage may transform the reconfigured content into an intermediate representation for further processing by the middle stage. The intermediate representation may include a lower-level representation of the reconfigured content.

The middle stage may perform optimizations on the intermediate representation that are independent of a platform to which the content is to be published. Examples of middle stage optimizations may include removal of useless code in the reconfigured content (e.g., dead code elimination), removal of unreachable code in the reconfigured content (e.g., a reachability analysis), discovery and propagation of constant values (e.g., constant propagation), relocation of a computation to a less frequently executed place (e.g., out of a loop), specialization of a computation based on a context, and/or the like. The middle stage may produce an optimized intermediate representation that may be utilized by the back end stage.

The back end stage may receive the optimized intermediate representation from the middle stage, and may perform more analysis, transformations, optimizations, and/or the like that are specific for a platform to which the content is to be published. The back end stage may generate a target-dependent assembly code, and may perform register allocation. The back end stage may perform instruction scheduling, which reorders instructions to maintain parallel execution. The back end stage may output machine code specialized for a platform to which the content is to be published.

In some implementations, content publishing platform 220 may test of the compiled different reconfigured content by emulating, at content publishing platform 220, operation of the compiled different reconfigured content for each destination platform; by sending the compiled different reconfigured content to each destination platform, determining how the compiled different reconfigured content executes, and improving the compiled different reconfigured content based on how compiled different reconfigured content executed (e.g., by improving speed, fixing errors, reconfiguring compiled different reconfigured content, rewriting compiled different reconfigured content, and/or the like); and/or the like.

In this way, content publishing platform 220 may compile the different reconfigured content to generate the different compiled content for the different platforms.

As further shown in FIG. 4, process 400 may include modifying one or more of the different compiled content if the one or more different compiled content includes duplicate information (block 450). For example, content publishing platform 220 (e.g., using computing resource 224, processor 320, and/or the like) may modify one or more of the different compiled content if the one or more different compiled content includes duplicate information. In some implementations, a duplicate search engine, of content publishing platform 220, may retrieve or receive the compiled content for the platforms, and may compare the compiled content with previously published or uploaded content. In some implementations, content publishing platform 220 may store the previously uploaded content in a data structure, and the previously uploaded content may include one or more portions of previously uploaded content, one or more previous versions of content, one or more previous releases of content, and/or the like. For example, if the content creator is uploading a second version of a second release of a video game, the duplicate search engine may compare the second version of the second release of the video game to all versions associated with a first release of the video game and to a first version of the second release of the video game.

In some implementations, if the duplicate search engine finds a portion of the compiled content that matches previously uploaded content, the duplicate search engine may modify the compiled content to remove the portion of the compiled content in order prevent re-uploading of the previously uploaded content (e.g., to eliminate duplicate information). This may save time and conserve resources associated with publishing or uploading the compiled content.

In this way, content publishing platform 220 may modify the one or more of the different compiled content if the one or more different compiled content includes the duplicate information.

As further shown in FIG. 4, process 400 may include comparing the different compiled content to license information, and retrieving any necessary licenses for the different compiled content (block 460). For example, content publishing platform 220 (e.g., using computing resource 224, processor 320, and/or the like) may compare the different compiled content to license information, and may retrieve any necessary licenses for the different compiled content. In some implementations, a license manager engine, of content publishing platform 220, may retrieve or receive the compiled content for the platforms, and may compare the compiled content for the platforms with license information provided in a data structure to ensure that licenses are provided for the compiled content. In some implementations, the license manager engine may compare the compiled content with the license information in order to determine whether the compiled content violates any licenses and/or requires any licenses. In some implementations, if the license manager engine determines that the compiled content violates a license or requires a license, the license manager engine may retrieve or obtain the license and may activate the license.

In this way, content publishing platform 220 may compare the different compiled content to the license information, and may retrieve any necessary licenses for the different compiled content.

As further shown in FIG. 4, process 400 may include providing the different compiled content to different client devices corresponding with the different platforms (block 470). For example, content publishing platform 220 (e.g., using computing resource 224, processor 320, and/or the like) may provide the different compiled content to different client devices 210 corresponding with the different platforms. In some implementations, different users associated with different client devices 210 (e.g., a desktop computer, a mobile device, a tablet computer, a game console, and/or the like) may access the content publishing platform (e.g., via credentials and authentications), and may request the content, provided by the content creator, from content publishing platform 220. In some implementations, content publishing platform 220 may provide the content in the different formats associated with the different client devices 210, from the data structure hosting content, to the different client devices 210, and the different client devices 210 may display the content to the different users.

In this way, content publishing platform 220 may provide the different compiled content to the different client devices 210 corresponding with the different platforms.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a content publishing platform that automatically configures and compiles content for multiple diverse computing platforms. For example, the content publishing platform may receive content and a request to publish the content to multiple different platforms (e.g., computing platforms), and may configure the content for the different platforms to generate different content configurations. The content publishing platform may compile the different content configurations to generate different compiled content for the different platforms, and may modify one or more of the different compiled content if the one or more of the different compiled content includes duplicate information (e.g., information that is the same as information previously published by the content publishing platform). The content publishing platform may determine whether licenses are provided for the different compiled content, and may retrieve any necessary licenses for the different compiled content. The content publishing platform may provide the different compiled content to different client devices corresponding with the different platforms.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by device, a request to configure and compile content for different computing platforms;
receiving, by the device, the content and content information associated with the content,
the content information including:
metadata associated with the content,
a release identifier associated with the content, and
a version associated with the content;
reconfiguring, by the device, the content for the different computing platforms, based on the request and based on the content information, to generate different reconfigured content;
determining, by the device, whether the different reconfigured content requires activation of a license;
obtaining, by the device, the license when the different reconfigured content requires activation of the license;
activating, by the device, the license for the different reconfigured content;
transforming, by the device, the different reconfigured content into intermediate representations;
performing, by the device, optimizations on the intermediate representations to generate optimized intermediate representations,
where the optimizations include one or more of:
removal of useless code in the different reconfigured content, or
removal of unreachable code in the different reconfigured content;
performing, by the device, an analysis of the optimized intermediate representations to generate different compiled content for the different computing platforms; and
providing, by the device, at least one of the different compiled content to a client device associated with at least one of the different computing platforms.

2. The method of claim 1, further comprising:
securely storing the content and the content information in a data structure.

3. The method of claim 1, further comprising:
storing the different compiled content in a data structure; and
receiving, from the client device, a request for the content, and
where providing the at least one of the different compiled content comprises:
providing, to the client device and based on the request for the content, the at least one of the different compiled content from the data structure.

4. The method of claim 3, further comprising:
determining that at least one of the different compiled content matches previously stored content in the data structure; and
removing the at least one of the different compiled content from the different compiled content prior to storing the different compiled content in the data structure.

5. The method of claim 1, where reconfiguring the content comprises:
preventing modification of portions of the content that are platform independent; and
modifying other portions of the content that are associated with platform functionality.

6. The method of claim 1, where the optimizations performed on the intermediate representations include one or more of:
discovery and propagation of constant values,
relocation of a computation to a less frequently executed place, or
specialization of a computation based on a context.

7. A device, comprising:
one or more memories; and
one or more processors, communicatively coupled to the one or more memories, to:
receive a request to publish content for different computing platforms;
receive the content to be published for the different computing platforms;
reconfigure the content for the different computing platforms, based on one or more labeled categories of information, to generate different reconfigured content;
transform the different reconfigured content into intermediate representations;
perform optimizations on the intermediate representations to generate optimized intermediate representations,
where the optimizations include one or more of:
removal of useless code in the different reconfigured content, or
removal of unreachable code in the different reconfigured content;
perform an analysis of the optimized intermediate representations to generate different compiled content for the different computing platforms; and
provide at least one of the different compiled content to a client device associated with at least one of the different computing platforms.

8. The device of claim 7, where the one or more processors are further to:
facilitate selection by a content creator of the one or more labeled categories of information.

9. The device of claim 7, where the one or more processors are further to:
determine that the different reconfigured content requires activation of a license;
obtain the license based on determining that the different reconfigured content requires activation of the license; and
activate the license for the different reconfigured content.

10. The device of claim 7, where the one or more processors are further to:
receive content information associated with the content, the content information including:

metadata associated with the content,
a release identifier associated with the content, and
a version associated with the content; and
store the content and the content information.

11. The device of claim 7, where the one or more processors are further to:
store the different compiled content in a data structure; and
receive, from the client device, a request for the content, and
where the one or more processors, when providing the at least one of the different compiled content, are to:
provide, to the client device and based on the request for the content, the at least one of the different compiled content from the data structure.

12. The device of claim 11, where the one or more processors are further to:
determine that at least one of the different compiled content matches previously stored content in the data structure; and
remove the at least one of the different compiled content from the different compiled content prior to storing the different compiled content in the data structure.

13. The device of claim 7, where the one or more processors, when reconfiguring the content, are to:
prevent modification of portions of the content that are platform independent; and
modify other portions of the content that are associated with platform functionality.

14. The device of claim 7, where the one or more processors, when compiling the different reconfigured content, are to:
transform the reconfigured content into programming languages understood by the different computing platforms.

15. A non-transitory computer-readable medium storing instructions, the instructions comprising:
one or more instructions that, when executed by one or more processors, cause the one or more processors to:
receive a request to configure and compile content for different computing platforms;
receive the content and content information associated with the content,
the content information including:
metadata associated with the content,
a release identifier associated with the content, and
a version associated with the content;
securely store the content and the content information;
reconfigure the content for the different computing platforms, based on the request and based on the content information, to generate different reconfigured content;
transform the different reconfigured content into intermediate representations;
perform optimizations on the intermediate representations to generate optimized intermediate representations,
where the optimizations include one or more of:
removal of useless code in the different reconfigured content, or
removal of unreachable code in the different reconfigured content;
perform an analysis of the optimized intermediate representations to generate different compiled content for the different computing platforms; and
provide at least one of the different compiled content to a client device associated with at least one of the different computing platforms.

16. The non-transitory computer-readable medium of claim 15, where the instructions further comprise:
one or more instructions that, when executed by the one or more processors, cause the one or more processors to:
determine whether the different reconfigured content requires activation of a license;
obtain the license when the different reconfigured content requires activation of the license; and
activate the license for the different reconfigured content.

17. The non-transitory computer-readable medium of claim 15, where the instructions further comprise:
one or more instructions that, when executed by the one or more processors, cause the one or more processors to:
store the different compiled content in a data structure; and
receive, from the client device, a request for the content, and
the one or more instructions, that cause the one or more processors to provide the at least one of the different compiled content, cause the one or more processors to:
provide, to the client device and based on the request for the content, the at least one of the different compiled content from the data structure.

18. The non-transitory computer-readable medium of claim 17, where the instructions further comprise:
one or more instructions that, when executed by the one or more processors, cause the one or more processors to:
determine that a portion of at least one of the different compiled content matches previously stored content in the data structure; and
remove the portion of the at least one of the different compiled content from the different compiled content prior to storing the different compiled content in the data structure.

19. The non-transitory computer-readable medium of claim 15, where the one or more instructions, that cause the one or more processors to reconfigure the content, cause the one or more processors to:
modify the content for hardware and software associated with the different computing platforms.

20. The non-transitory computer-readable medium of claim 15, where the optimizations performed on the intermediate representations include one or more of:
discovery and propagation of constant values,
relocation of a computation to a less frequently executed place, or
specialization of a computation based on a context.

* * * * *